United States Patent Office 3,359,402
Patented Dec. 19, 1967

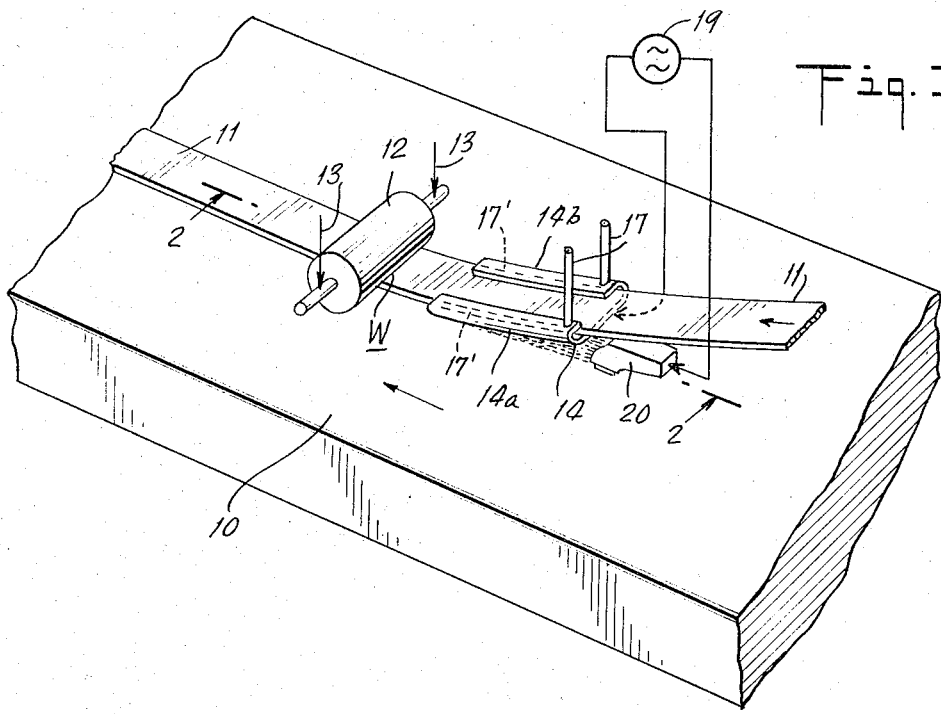
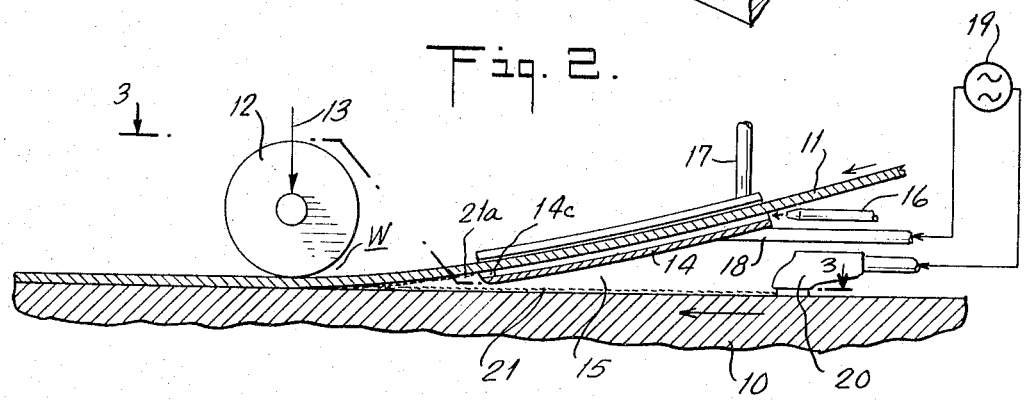
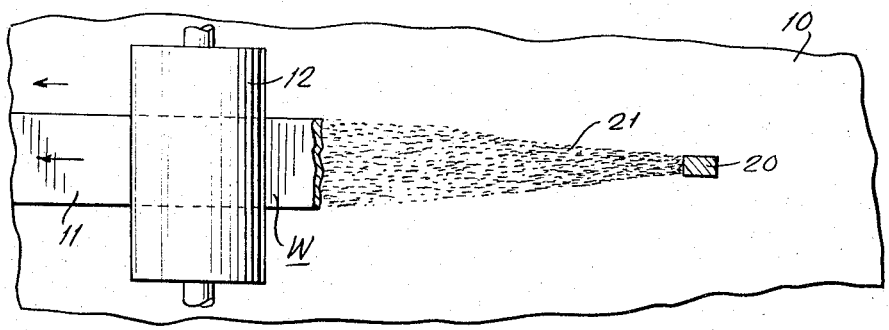

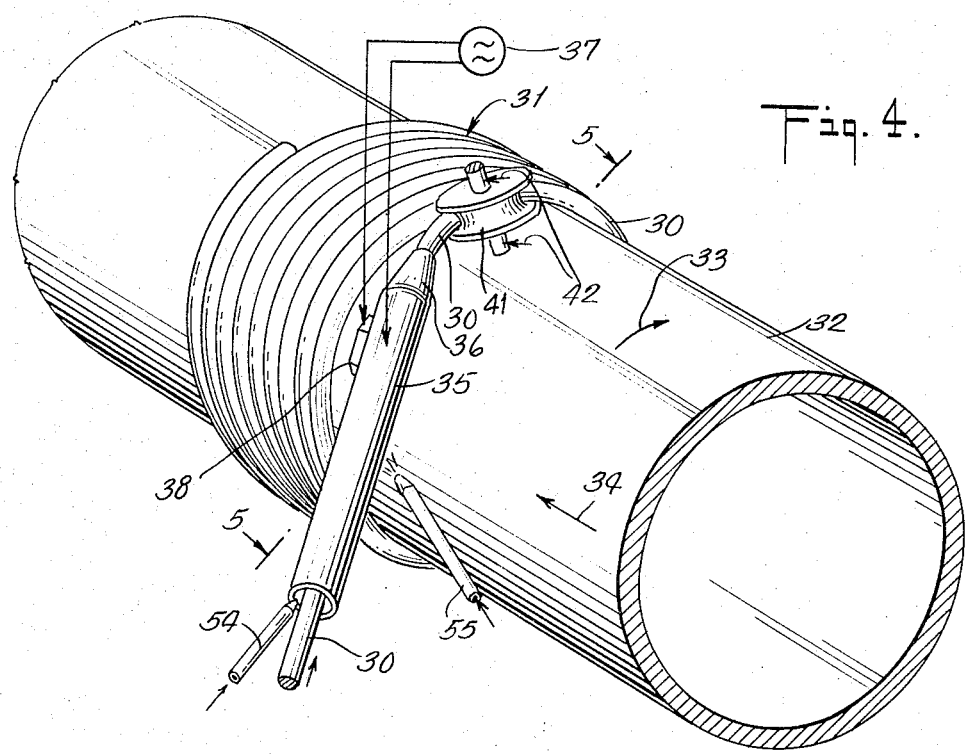
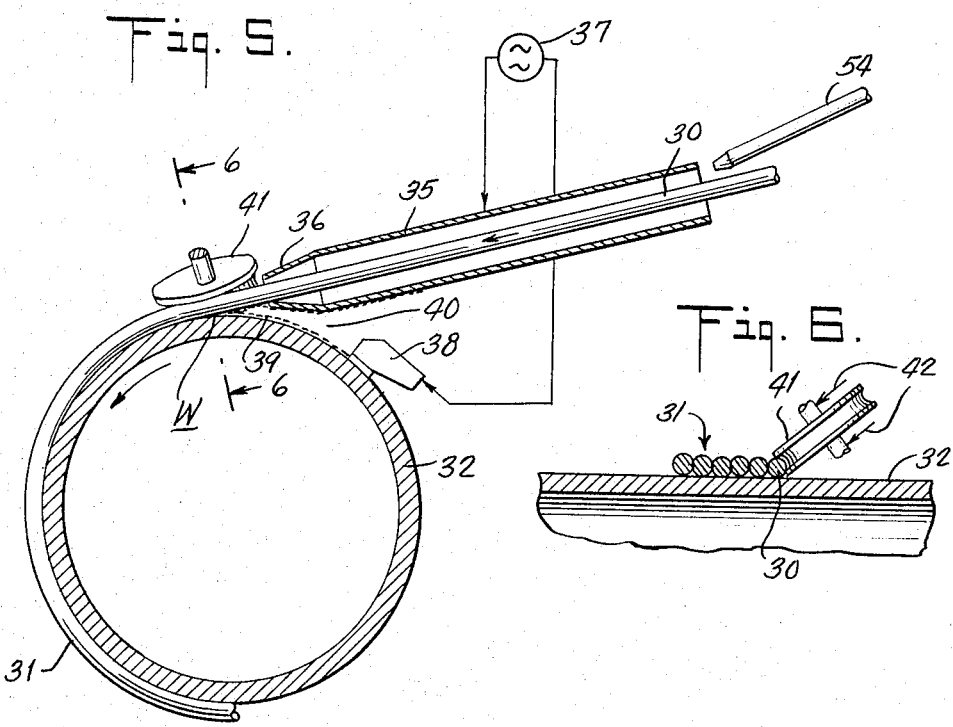

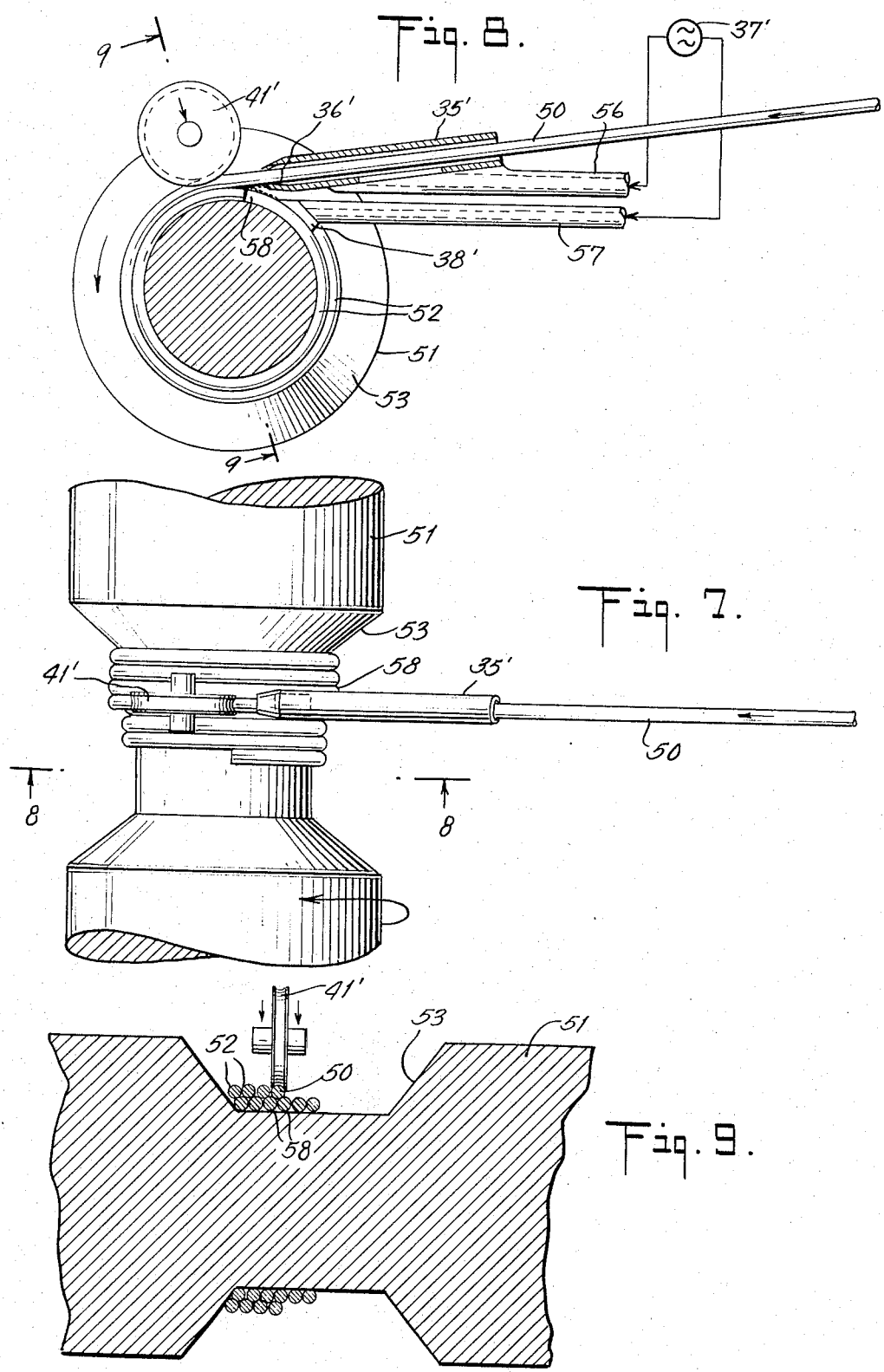

3,359,402
WELDING BY HIGH FREQUENCY RESISTANCE HEATING
Perry J. Rieppel, Worthington, Ohio, assignor, by mesne assignments, to American Machine & Foundry Company, New York, N.Y., a corporation of New Jersey
Filed Mar. 13, 1964, Ser. No. 351,686
12 Claims. (Cl. 219—117)

ABSTRACT OF THE DISCLOSURE

In the electric welding together of low and high thermal mass materials being brought together along convergent paths into contact, a cooled conductive element is located adjacent and in contact with the low thermal mass material and carries high frequency welding current to the latter at least near the weld point so that current flowing in the element has a proximity effect upon the return path current flowing in the high thermal mass material and reduces or eliminates current flow in the low thermal mass material until it nears the weld point. Material can be built up on a cylindrical surface by coiling and welding a plurality of layers of wire thereon.

---

This invention relates to welding together of metal portions and more particularly to welding by the use of high frequency current conductively applied for heating the parts which are to be welded together.

It has become well known practice to weld metal portions together while continuously advancing same in such manner that the edges, or other portions thereof which are to be welded together, are caused to approach each other with a V-shaped gap therebetween, the apex of which is at or adjacent the weld point, and while high frequency current is applied by contacts engaging the metal portions respectively at positions in advance of the weld point so that the heating current flows from such contacts to and from the weld point along on the edge surfaces of the V-shaped gap. This method has proven to be highly satisfactory such as for the longitudinal welding of metal tubing, among other types of work. Yet in cases where one of the metal portions has relatively small heat-distributing capability due for example to having small cross-sectional dimensions as compared with the other, and particularly if the method is to be carried out rapidly with the consequent use of substantial amounts of power, there may be a tendency for the smaller metal portion to become overheated before the desired line to be welded on the other metal portion can become heated up to the desired welding temperature upon reaching the weld point. Difficulties of this nature may, for example, occur when it is attempted to weld a continuously-advancing, relatively thin metal strip to another advancing metal body having large cross-sectional dimensions. Thus when a base metal body is to be cladded with a thin metal strip, the latter may become overheated and injured by the high frequency current, while the heating current on the base metal may be so distributed over the body of the metal, that same does not reach the desired welding temperature at the weld point. Such difficulties may also arise when for example a small tube or coiled wire is to be welded around in embracing relationship to a relatively larger rod, shaft or tube, and particularly in cases for example where it may be desired to weld a coil of wire or the like in one or more layers for example within a peripheral groove on a shaft.

With the present invention, it has been found possible satisfactorily to avoid these difficulties by providing a metal sleeve or the like, preferably fluid-cooled, and through or along which the smaller of the metal portions to be welded is advanced at the region shortly in advance of the weld point, one terminal of the high frequency current being applied to such sleeve or the like, and the other terminal being applied to the heavier member to be welded at a position along the desired weld line and shortly in advance of the weld point. Thus with this arrangement, in effect a V-shaped gap is provided, extending from one of the high frequency terminals along on the cooled sleeve or the like and to or close to the weld point, thence back on the heavier or larger metal portion along a band or line thereon conforming to the desired weld line or band and finally to the other high frequency contact.

This arrangement serves surprisingly well in performing two highly advantageous functions. First the fluid-cooled sleeve or the like serves to protect the metal portion which is to be welded, against excessive heating, while still enabling the point of application of the high frequency current thereto to be spaced sufficiently in advance of the weld point so as not to interfere with the desired positioning of whatever squeeze rollers or other facilities are provided for bringing the parts together at the weld point. Secondly, the fluid-cooled sleeve or the like, forming as it does one side of the above-explained V-shaped gap arrangement serves in effect to provide what may be called a proximity conductor extending along in opposed relation to the desired path of the heating current along the larger or heavier metal portion to be welded, and because of its proximity thereto, serving more effectively to concentrate the high frequency current along the particular path of the desired weld line on the heavier member, thus preventing the current and resulting heating effect on the latter, from becoming excessively distributed and causing same to be so effectively concentrated as to bring the metal to welding temperature corresponding to the temperature on the smaller or lighter element when the two members reach the weld point.

Various further and more specific objects, features and advantages of the invention will appear from the description given below, taken in connection with the accompanying drawings, illustrating by way of example preferred forms of the invention.

In the drawings:

FIG. 1 is a perspective view illustrating an embodiment of the invention where a relatively thin metal strip is being cladded to a base metal member while the two are being advanced to and past a desired weld point or region;

FIG. 2 is a vertical sectional view taken substantially along line 2—2 of FIG. 1;

FIG. 3 is a generally horizontal sectional view taken substantially along line 3—3 of FIG. 2;

FIG. 4 is a perspective view of an alternative embodiment of the invention wherein a small wire or tube is being coiled about and welded to a larger tubular element or shaft;

FIG. 5 is a transverse sectional view of the arrangement of FIG. 4 taken substantially along line 5—5 of FIG. 4;

FIG. 6 is a sectional view taken substantially along line 6—6 of FIG. 5;

FIG. 7 is a plan view of another alternative embodiment of the invention wherein a small wire or tube is being coiled about a shaft and welded within a circumferential groove on the latter; and FIGS. 8 and 9 respectively are sectional views taken substantially along lines 8—8 of FIG. 7 and 9—9 of FIG. 8.

Referring now to the drawings in further detail, with the embodiment of the invention shown in FIG. 1, a metal member 10 is shown while being advanced in the direction of the arrow past a region at w where a relatively thin metal strip 11 is being welded thereto, the parts being pressed together at the desired welding region for example by a roller 12 urged downwardly in the direction of the arrows 13 by any suitable means (not shown) into pressure engagement with the strip 11, whereby the latter, which has just become heated to welding temperature, is pressed into welding engagement with the member 10. The members 10 and 11, of course, may be advanced by any suitable mechanical means (not shown) and at a speed which may be quite rapid, in some instances running up to possibly hundreds of linear feet per minute.

Shortly in advance of the desired weld point or region, the strip 11 passes through a fluid-cooled sleeve or the like 14. As here illustrated, this element, which may be mounted on any suitable mounting means (not shown) is shaped to extend over the undersurfaces of the strip member 11 and also its side edges at 14a and 14b and so as to extend up around and then somewhat inwardly of said edges respectively. As more clearly appears in FIG. 2, the member 14 preferably, although not necessarily, is of dimensions and is so positioned that it need not touch the surfaces of the strip 11 except at the lower tip 14c. Furthermore, while the member 14 is above referred to as a "sleeve" and, as here shown, is sleeve-like to the extent that the edges enclose the edges of the strip 11, yet it will be understood that this member might, if desired, be largely confined to the portions thereof which extend along beneath the strip 11, that is, those portions thereof which in effect form one side of the V-shaped gap 15, as above explained and as appears in FIG. 2.

The member 14 may be fluid cooled in various ways. For example, as indicated in FIG. 2, cooling water may be projected as from a nozzle 16 into and along the space between the lower surface of the strip 11 and the member 14. Additionally or alternatively, cooling fluid may be admitted through tubular supporting portions 17 to flow along through cavities such as indicated by dotted lines 17' in FIG. 1. Alternatively, cooling fluid may be admitted through a tubular member 18, as shown in FIG. 2, which forms one of the connections for the high frequency heating current coming from a suitable source thereof schematically indicated at 19. That is, if cooling fluid is projected through the connection 18, same will be discharged into the space beneath the strip 11 and serve to prevent same from becoming overheated.

The other terminal of the source 19 of the high frequency current is connected to a suitably fluid-cooled contact 20 which may be of a well-known construction. Thus the high frequency current will follow a path from the contact 20 along on the member 10, that is, along a path on the latter member as indicated by the dots 21, thence to the welding region w, then back along on the undersurface of strip 11, as indicated at 21a, the path then extending onto the undersurface of member 14 back to connection 18.

As best shown in FIG. 3, the current path on the member 10 starting at the contact 20, will tend to spread out to the full width of the strip 11 by the time the members to be welded together are about to approach the weld region w, this spreading-out effect being caused by the proximity of the undersurface of the member 14 whereby, by reason of the powerful effects of mutual inductance between the currents on opposite sides of the V-shaped gap, the current will be so controlled that only the very surface portions on member 10 which are to be welded to strip 11, will become heated to welding temperature.

The current used may be of a radio frequency of the order of 50,000 to 100,000 cycles per second, or preferably a considerably higher frequency, such as 300,000 to 400,000 cycles per second, and the amount of power applied being sufficient, as may be determined by trial, to cause the approaching surfaces which are to be welded to reach welding temperature at the desired welding region or point and depending upon the speed, the extent of the areas to be welded, and the masses and heat-adsorbing or distributing characteristics of the parts.

The embodiment of the invention shown in FIGS. 4–6 inclusive is generally similar in principle to that of FIGS. 1–3, except that in FIGS. 4–6 a small wire or length of small tubing as at 30, is to be wrapped around and welded as a coil 31 to the exterior surface of a larger tube or shaft 32. Here the latter is rotated in the direction of the arrow 33 by any suitable means (not shown) while either the tube is advanced by suitable means longitudinally in the direction of the arrow 34, or else the winding and welding facilities are advanced relatively with respect to the position of the tube 32.

As further shown in FIGS. 4–6, the smaller metal member, such as the wire 30, at a region in advance of its tangential contact with the tube 32, is passed through or along an element 35 corresponding to the member 14 of FIG. 1. Here the element 35 is shown as taking a tubular form, supported by suitable means (not shown) and which encircles the member 30 in spaced relation thereto, except that the forward end 36 thereof may be restricted to there engage the wire or other member 30 shortly in advance of the weld point or zone indicated at w in FIG. 5, for example.

The source of high frequency current, here indicated at 37, has one terminal connected to the element 35, and its other terminal connected to a fluid-cooled contact of suitable known form, as at 38, which bears against the larger tube or shaft 32 at a point shortly in advance of where the line or area of the desired weld on member 32 comes up to the weld point w. The resulting high frequency current path on the parts to be heated will then be as shown by the rows of dots 39. It will be apparent that, between the current path portions on the members 32 and 35, a V-shaped gap, in effect, will be formed, as indicated at 40. And since the lower surface of the element 35 approaches more and more into close proximity with the desired line or band of the weld on member 32 as the weld point is approached, the element 35 will, by reason of mutual inductance, tend very effectively to concentrate the current along path 39 at the very surface of the member 32 which is to be brought up to welding temperature, as is also the opposed surface on the member 30 just shortly prior to its reaching the weld zone.

The wire or small tubing 30 may be suitably directed, guided and controlled as to its position, for example as by roller means indicated at 41, the supporting shaft of which is urged, by any suitable means, in the direction indicated by the arrows 42 in FIG. 4, so as to cause each convolution of the member 30 at the region of the weld zone to be pressed down against member 32, as well as against the previous convolution, if desired.

The embodiment shown in FIGS. 7–9 inclusive is also generally similar to those described above, except that here a small tube or wire element as at 50 is being wound around a shaft 51 to form a plurality of coils as at 52 welded in position for example within a circumferential groove 53 formed on the shaft 51. Parts here generally corresponding to those of FIGS. 4–6 inclusive are identified by the same reference numerals accompanied by prime marks. The member 35, as shown in FIGS. 4 and 5, may be cooled as by the use of a nozzle 54 projecting cooling fluid into the member. Additionally or alternatively, cooling fluid may be projected from a nozzle 55 against the parts at the welding region, or the members as at 35 in FIGS. 4 and 5 and as at 35' in FIGS. 7 and 8, may be cooled by cooling fluid flowing through a hollow conductor 56 for the high frequency current, and in such manner as to discharge the cooling fluid into the space within the member 35' surrounding the wire or the like 50.

In FIGS. 7 and 8 it will be apparent that the high frequency current path will extend from the source 37' to a fluid-cooled connection portion 57 to contact 38', thence circumferentially over the surface of member 51, or else circumferentially over the surfaces of previously applied convolutions as at 58 to the zone of tangency, viz. where the member 50 engages and is drawn onto and becomes welded to either the surface of rotating member 51 or onto the surface areas of previously applied convolutions thereon, and from such zone of tangency the current path extends back along the member 50, thence onto the member 35' and the connection portion 56 back to the current source 37'. Thus the lower side of the V-shaped gap here in effect will be constituted either of a circumferential portion of the surface of member 51 within the groove 53, or else portions of the surfaces of the previously applied convolutions 58, whereas the opposed upper side of the V-shaped gap will be constituted in part of the undersurface of member 50 and undersurface portions of the member 35', the latter serving by reason of mutual inductance between the current thereon and the current on the undersurface of the V-shaped gap, to cause the current to be very effectively concentrated along the desired path forming the underside of the V-shaped gap, and meanwhile the member 50, which ordinarily has much less heat-distributing capability than the member 51, will be protected against overheating, not only by reason of the fact that the member 35' is fluid-cooled, but also because the current thereon at its portions nearest the welding zone will be initially strongly concentrated on the undersurface of the member 35'.

In FIGS. 4 and 8 respectively, while the members 30 and 50 are referred to herein as wire or the like, it will be understood that same may be of any desired cross-sectional shape, hollow or otherwise, or strip-like to form for example fins on edge. An important aspect of the invention here is particularly concerned with the problem of protecting such members of relatively lower heat-distributing capability, whatever their cross-sectional shape, against overheating, while at the same time preferably causing the desired current path on the other member of higher heat-distributing capability, to be concentrated as sharply as possibly along the desired or intended welded seam line thereon. Also, of course, depending upon the speed of the longitudinal movement of the members such as at 32, 51, the convolutions of wire or the like applied thereto may be welded either side by side in contact as shown, or as helically-extending spaced convolutions. It will be apparent that the invention makes possible in effect the building up for any desired purpose, of the cross-sectional area of any desired portion of a metal member such as shown at 51 by winding a plurality of layers of a separately formed metal strand thereabout in embracing relation thereto, while at the same time continuously welding the convolutions of such strand to the convolutions thereunder or to the main metal member, and by heating to welding temperature only those surface portions which are actually being welded together, thus avoiding overheating of or injury to any other portions of the metal parts.

With all embodiments of the invention, the cooling fluid for the contacts as well as for the cooled elements may comprise water or any other suitable cooling liquid, or even jets of cooled air or other gases, passing through or impinging on the cooled element, such as cold inert gas.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding an elongated first metal member of a character and with cross-sectional dimensions such as to have a relatively low heat-distributing capability, to another metal member having a relatively higher heat-distributing capability, said method comprising: so advancing said members that the seam lines or areas desired to be welded on each will follow paths which approach and become contiguous at a welding point or zone; disposing a cooled element having a conductive portion with said conductive portion extending along and adjacent said first member for a substantial distance in advance of the welding zone and extending along and in proximity to but spaced from said area on said other member and spaced from said welding zone; and heating said members along said seam areas by the use of radio frequency current connected to flow to and from the weld zone by supplying said current to a point on said other member in advance of said zone and to a first point on said conductive portion in advance of the end thereof nearest said zone and contacting said conductive portion with said first member at least at a second point nearer to said zone than said first point and said point on said other member but spaced from said zone to cause current to flow along the length of said conductive portion in advance of said second point and along the length of said first member at least from said second point to said weld zone; and maintaining the length of said conductive portion which is adjacent any current carrying portion of said first member in advance of said second point at least substantially as close to said area on said other member as the current carrying surface of said first member in advance of said second point and facing said last-mentioned area, said cooled element thereby preventing overheating of said first member and the current flowing thereon acting by reason of mutual inductance to concentrate the current flowing on said second member along the line of the desired seam.

2. Method for welding an elongated first metal member of a character and with cross-sectional dimensions such as to have a relatively low heat-distributing capability, to another metal member having a relatively higher heat-distributing capability, said method comprising: so advancing said members that the seam lines or areas desired to be welded on each will follow paths which approach and become contiguous at a welding point or zone; disposing a stationary fluid-cooled conductive element through which said first member is advanced for a substantial distance prior to reaching the welding zone between said areas but spaced from said other member and said weld point; contacting said element with said first member at least at or near the end thereof nearest said weld point; and heating said members along such seam areas by the use of radio frequency current connected to flow to and from said weld zone from points in advance of said zone located respectively on said other member and on said element, said last-mentioned point on said element being more remote from said weld point than said end thereof in contact with said first member and said cooled element thereby preventing overheating of said first member and the current flowing thereon acting by reason of mutual inductance to concentrate the current flowing on said second-named member along the line of the desired welded seam.

3. Method for welding an elongated relatively thin metal strip member to another metal member having a relatively higher heat-distributing capability, said method comprising: so advancing said members that the seam areas desired to be welded on each will follow paths which approach and become contiguous at a welding zone; disposing a cooled element having a conductive portion with said conductive portion extending along and between said strip member and said other member for a substantial distance in advance of the welding zone and facing said other member; and heating said members along such seam areas by the use of high frequency current connected to flow to and from said weld zone by supplying said current to a point on said other member in advance of said zone and to a first point on said conductive portion in advance of the end thereof nearest said zone and contacting said conductive portion with said strip member at least at a second point nearer to said zone than said first point and said point on said other member but spaced from said zone to cause current to flow along the length of said conductive portion in advance of said second point and along the length of said strip member at least from said second point to said weld zone, said cooled element thereby preventing overheating of said strip member and the current flowing thereon acting by reason of mutual inductance to concentrate the current flowing on said other member along the area of the desired seam.

4. Method for coiling metal wire or the like in one or more layers and welding same about a metal member having a relatively higher heat-distributing capability than the wire, said method comprising: rotating and advancing said member relative to the wire to cause the latter to be advanced generally tangentially onto the underlying metal surface and to be coiled about said member; disposing a cooled element having a conductive portion with said conductive portion extending along the wire for a substantial distance in advance of the zone of tangency where the wire is to be welded in place and between said wire and said member but spaced from said member and said zone of tangency; contacting said conductive portion with said wire at least at a point near but spaced from said point of tangency; and supplying high frequency current to said underlying surface in advance of said zone of tangency and to said conductive portion in advance of the point of contact between said conductive portion and said wire nearest said zone to heat a surface portion on the wire and on said underlying metal surface up to welding temperature as same advance into contact at said zone, said current being caused to flow along a V-shaped path, one side of which extends circumferentially along on said underlying surface and the other side of which V-shaped path is constituted partly of the opposed surface portion of the wire and at least partly of the conductive portion of said cooled element.

5. Method for winding metal wire or the like and welding same about a metal member having a relatively higher heat-distributing capability than the wire, said method comprising: rotating and advancing said member relative to the wire to cause the latter to be advanced generally tangentially onto the member and to be wound thereon; disposing a cooled element having a conductive portion with said conductive portion extending along the wire for a substantial distance in advance of the zone of tangency where the wire is to be welded in place and between said wire and said member but spaced from said member and said zone of tangency; contacting said conductive portion with said wire at least at a point near but spaced from said point of tangency; and supplying high frequency current to said member in advance of said zone of tangency and to said conductive portion in advance of the point of contact between said conductive portion and said wire nearest said zone to heat surface portions on the wire and on said member up to welding temperature as same advance into contact at said zone, said current being caused to flow along a V-shaped path, one side of which extends circumferentially along on said member, and the other side of which V-shaped path is constituted partly of the opposed surface portion of the wire and at least partly of the conductive portion of said cooled element.

6. Method for coiling metal wire or the like in one or more layers and welding same about a metal member within a generally annular groove thereon, said method comprising: rotating and advancing said member relative to the wire to cause the latter to be advanced generally tangentially onto the underlying metal surface and to be coiled about within such groove; disposing a cooled element having a conductive portion with said conductive portion extending along the wire for a substantial distance in advance of the zone of tangency where the wire is to be welded in place and between said wire and said member but spaced from said member and said zone of tangency; contacting said conductive portion with said wire at least at a point near but spaced from said point of tangency; and supplying high frequency current to said underlying surface in advance of said zone of tangency and to said conductive portion in advance of the point of contact between said conductive portion and said wire nearest said zone to heat a surface portion on the wire and said underlying metal surface up to welding temperature as same advance into contact at said zone, said current being caused to flow along a V-shaped path, one side of which extends circumferentially along on said underlying metal surface, and the other side of which V-shaped path is constituted partly of the opposed surface portion of the wire and at least partly of the conductive portion of said cooled element.

7. Apparatus for welding an elongated first member of a character and with cross-sectional dimensions such as to have a relatively low heat-distributing capability, to another member having a relatively higher heat-distributing capability, said apparatus comprising in combination: means for so advancing said members that the seam lines or areas desired to be welded on each will follow paths which approach and become contiguous at a welding point or zone; a cooled element having a conductive portion extending along said first member for a substantial distance in advance of the welding zone, said element being mounted with said conductive portion between said members and spaced from said other member and said weld point and said conductive portion being engageable with said first member at the end thereof nearer said weld point; and means for heating said members along said seam areas comprising means for connecting a high frequency source of current to a point on said conductive portion in advance of its point of engagement with said first member and to a point on said other member in advance of said weld point thereby to cause such current to flow to and from the weld zone from points in advance of said zone located respectively on said other member and on said element, said cooled element thereby preventing overheating of said first member and the current flowing thereon acting by reason of mutual inductance to concentrate the current flowing on said other member along the line of the desired seam.

8. Apparatus in accordance with the foregoing claim 7 and in which said cooled element comprises a stationary conductive means at least partially covering successive lengths of said first member as same is advanced, and being spaced at least in part from said first member for receiving a flow of cooling fluid around said first member and between same and said element, 9. Welding apparatus in accordance with the foregoing claim 7 and in which the first member comprises wire or the like, and means is provided for rotating and advancing said other member relative to the wire to cause the latter to be advanced generally tangentially onto such other member and to be wound therearound while said heating current welds the wire to the surface underlying said wire at the zone of tangency.

10. Method of building up the effective cross-sectional area of a metal member which comprises: winding thereabout in embracing relation thereto a plurality of layers of convolutions of a metal strand while welding such convolutions in place by disposing a conductive element adjacent and extending along said metal strand in advance of the engagement point where it engages the underlying metal surface and extending in proximity to and along the underlying metal surface to be heated, maintaining said element spaced from said point and spaced from said underlying surface a distance no greater than the spacing between the underlying surface and the surface of the strand to be welded thereto which is adjacent said element, contacting said element with said strand at least near the end thereof nearest said point, and supplying high frequency heating current to a point on said underlying surface in advance of said engagement point and to a point on said element in advance of its point of contact with said strand nearest said engagement point thereby concentrating the current on and heating to welding temperature only those surface portions of the metal which are being brought into engagement for welding during winding of the strand in place.

11. Method in accordance with the foregoing claim 10 and in which the convolutions of one layer are interspaced with the convolutions of the layer beneath same which contacts therewith.

12. Method in accordance with the foregoing claim 10 and in which the plurality of layers of convolutions are wound and welded in place within a generally annular depression in said metal member.

References Cited

UNITED STATES PATENTS

| | | | |
|---|---|---|---|
| 1,323,621 | 12/1919 | Edwards | 219—56 |
| 2,376,762 | 5/1945 | Ferguson | 219—107 |
| 2,479,556 | 8/1949 | Chanowitz | 219—58 X |
| 2,821,619 | 1/1958 | Rudd | 219—107 |
| 2,833,910 | 5/1958 | Stanton et al. | 219—59 |
| 2,886,691 | 5/1959 | Rudd | 219—62 X |
| 2,904,668 | 9/1959 | Rudd et al. | 219—67 |
| 3,047,712 | 7/1962 | Morris | 219—107 |

RICHARD M. WOOD, *Primary Examiner.*

B. A. STEIN, *Assistant Examiner.*